(12) United States Patent
Suzuki

(10) Patent No.: US 10,607,655 B2
(45) Date of Patent: Mar. 31, 2020

(54) INFORMATION PROCESSING APPARATUS, INFORMATION PROCESSING METHOD, AND NON-TRANSITORY COMPUTER READABLE MEDIUM

(71) Applicant: FUJI XEROX CO., LTD., Tokyo (JP)

(72) Inventor: Mai Suzuki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/568,813

(22) Filed: Sep. 12, 2019

(65) Prior Publication Data

US 2020/0005833 A1    Jan. 2, 2020

Related U.S. Application Data

(60) Continuation of application No. 15/918,300, filed on Mar. 12, 2018, now Pat. No. 10,453,497, which is a division of application No. 15/441,777, filed on Feb. 24, 2017, now Pat. No. 9,947,368.

(30) Foreign Application Priority Data

Aug. 10, 2016    (JP) .................................. 2016-157950

(51) Int. Cl.
| | | |
|---|---|---|
| H04N 5/93 | (2006.01) | |
| G11B 27/34 | (2006.01) | |
| H04N 9/87 | (2006.01) | |
| G11B 27/10 | (2006.01) | |
| G09B 5/06 | (2006.01) | |

(52) U.S. Cl.
CPC .............. *G11B 27/34* (2013.01); *G09B 5/065* (2013.01); *G11B 27/102* (2013.01); *H04N 9/8715* (2013.01)

(58) Field of Classification Search
CPC ...... G11B 27/34; G11B 27/102; G09B 5/065; H04N 5/77; H04N 9/8715
USPC .................................. 386/285, 278, 343, 353
See application file for complete search history.

(56) References Cited

U.S. PATENT DOCUMENTS

| | | | |
|---|---|---|---|
| 6,795,092 B1 * | 9/2004 | Nagai ................... | G11B 27/10 715/716 |
| 8,290,341 B2 | 10/2012 | Hirata et al. | |
| 8,345,285 B2 * | 1/2013 | Sugimoto .......... | G03G 15/5091 358/1.13 |

(Continued)

FOREIGN PATENT DOCUMENTS

| | | | |
|---|---|---|---|
| JP | 2006-279111 A | 10/2006 | |
| JP | 2011-118292 A | 6/2011 | |

(Continued)

OTHER PUBLICATIONS

Feb. 5, 2019 Office Action issued in U.S. Appl. No. 15/918,300.
Oct. 18, 2019 Office Action issued in U.S. Appl. No. 15/918,300.

*Primary Examiner* — Robert Chevalier
(74) *Attorney, Agent, or Firm* — Oliff PLC

(57) ABSTRACT

An information processing apparatus includes a receiving unit that receives, during or after reproduction of a video, a predetermined operation with respect to the video, an associating unit that associates the received operation with a reproduction location where the received operation has been generated in the video, and a setting unit that sets in response to the received operation an importance degree of the reproduction location associated with the received operation.

1 Claim, 12 Drawing Sheets

(56) References Cited

U.S. PATENT DOCUMENTS

| | | |
|---|---|---|
| 9,947,368 B2 | 4/2018 | Suzuki |
| 2008/0285886 A1 | 11/2008 | Allen |
| 2012/0057775 A1 | 3/2012 | Suzuki et al. |
| 2013/0110565 A1 | 5/2013 | Means, Jr. et al. |

FOREIGN PATENT DOCUMENTS

| | | |
|---|---|---|
| JP | 2011-223287 A | 11/2011 |
| JP | 2013-102262 A | 5/2013 |
| JP | 2014-142586 A | 8/2014 |

\* cited by examiner

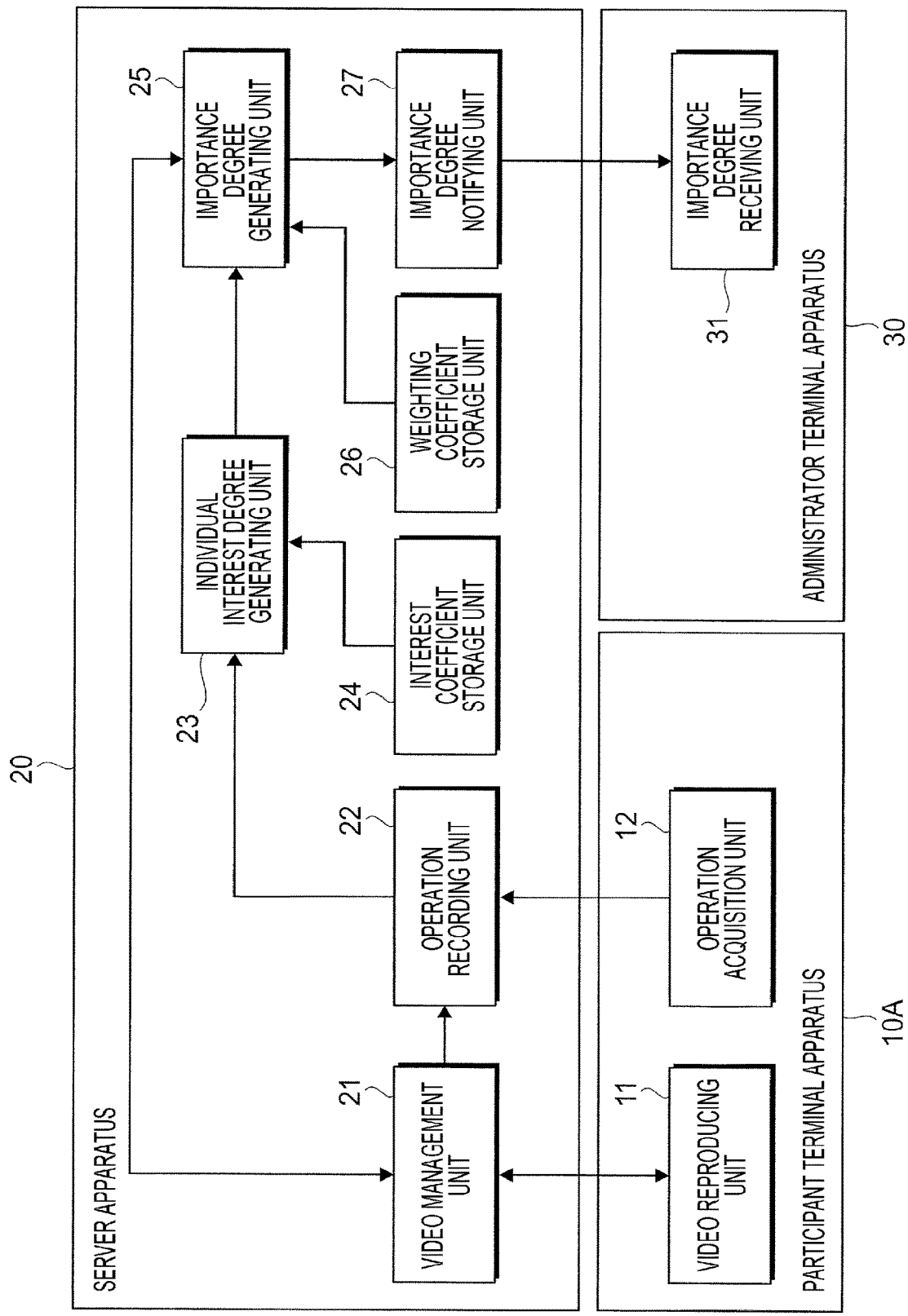

FIG. 4

| VIDEO TITLE | VIDEO FILE PATH | INDEX FILE PATH | IMPORTANCE DEGREE FILE PATH |
|---|---|---|---|
| INTRODUCTION TO BIOLOGY (FIRST SESSION) | C:$movie$biology1.wmv | C:$index$biology1.txt | C:$importance$biology1.dat |
| INTRODUCTION TO BIOLOGY (SECOND SESSION) | C:$movie$biology2.wmv | C:$index$biology2.txt | C:$importance$biology2.dat |
| INTRODUCTION TO BIOLOGY (THIRD SESSION) | C:$movie$biology3.wmv | C:$index$biology3.txt | C:$importance$biology3.dat |
| INTRODUCTION TO PHYSICS (FIRST SESSION) | C:$movie$physics1.wmv | C:$index$physics1.txt | C:$importance$physics1.dat |
| INTRODUCTION TO PHYSICS (SECOND SESSION) | C:$movie$physics2.wmv | C:$index$physics2.txt | C:$importance$physics2.dat |
| INTRODUCTION TO PHYSICS (THIRD SESSION) | C:$movie$physics3.wmv | C:$index$physics3.txt | C:$importance$physics3.dat |

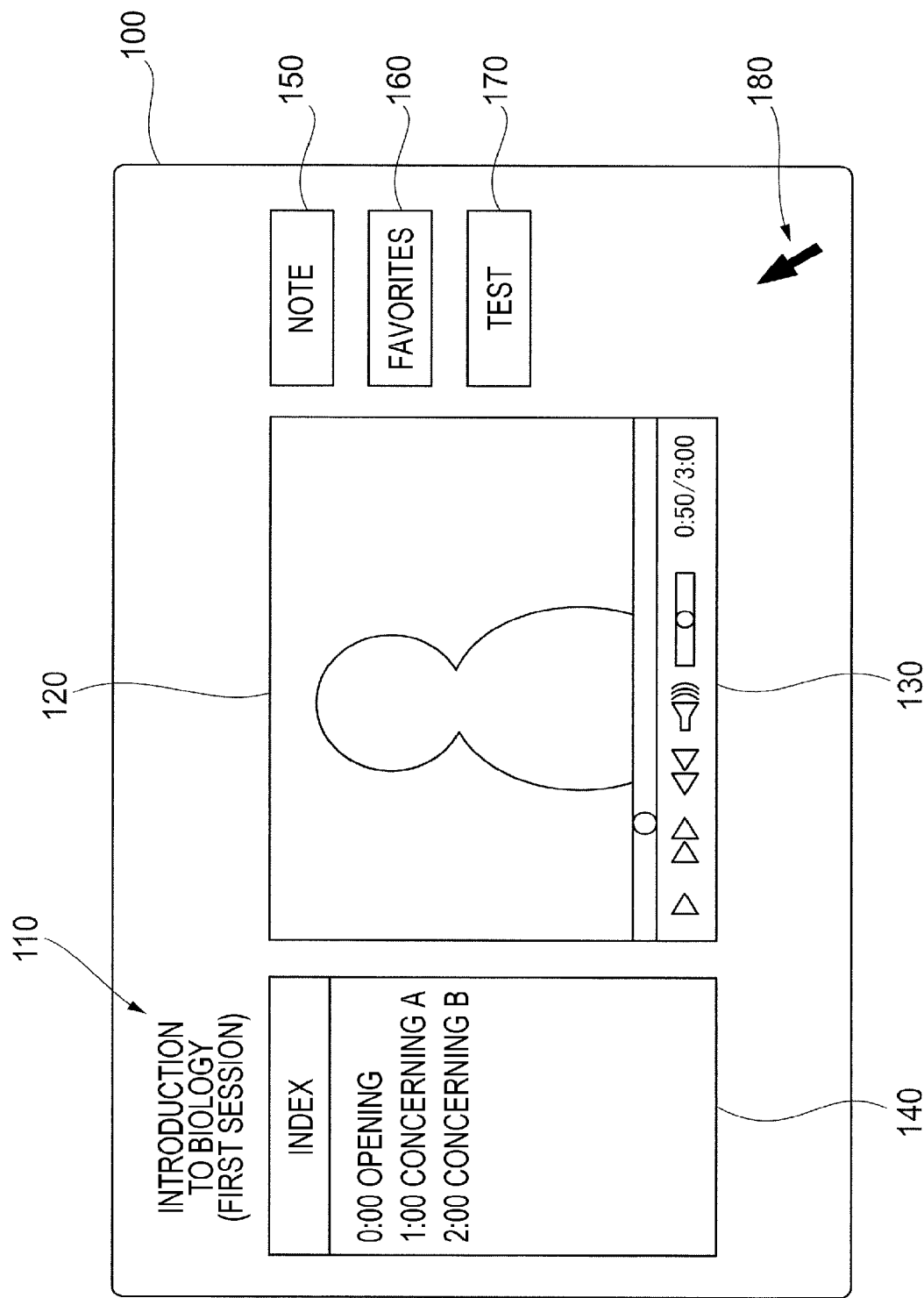

FIG. 8

| OPERATION TYPE | GENERATION TIMING | INTEREST COEFFICIENT | AFFECTED TIME | POSSIBLE REASON |
|---|---|---|---|---|
| NOTE | VIDEO VIEWING IN PROGRESS | +2 | DURATIONS OF 3 SECONDS BEFORE AND 3 SECONDS AFTER TIME WHEN NOTE WRITING STARTS | INTEREST DEGREE IS CONSIDERED TO BE HIGHER |
| FAVORITES | VIDEO VIEWING IN PROGRESS | +1 | DURATIONS OF 3 SECONDS BEFORE AND 3 SECONDS AFTER TIME WHEN FAVORITES ARE SET | FAVORITES ARE POSSIBLY SET TO REVIEW LATER |
| TEST | VIDEO VIEWING IN PROGRESS | -3 | AFTER VIEWING TIME WHEN SESSION TRANSITIONS INTO TEST | INTEREST DEGREE IS POSSIBLY TOO LOW FOR USER TO BE ANXIOUS TO VIEW EVENTUALLY |
| REPRODUCING | AFTER TEST | +1 | TIME WHEN REPRODUCTION STARTS | USER IS LIKELY TO REVIEW PROBLEM THAT USER IS UNABLE TO UNDERSTAND DURING TEST |

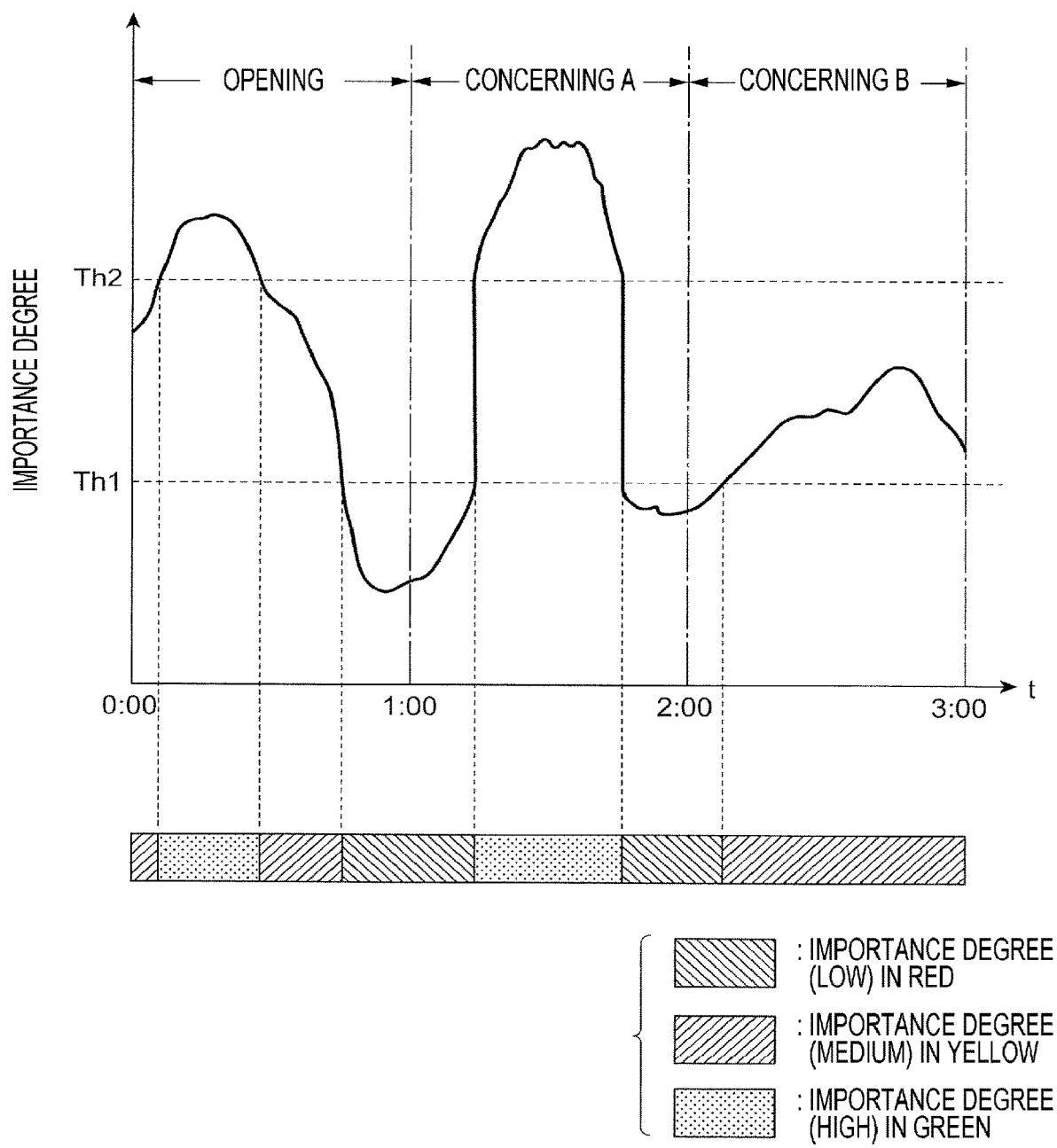

FIG. 11

| THUMBNAIL | TITLE | DATE OF UPDATE |
|---|---|---|
| | biology.1.wmv  0:00/0:30<br>CONVERTED  ☐ NOT YET VIEWED | 2016/01/13 11:38 |

FIG. 12A

| PARTICIPANT | WEIGHTING COEFFICIENT |
|---|---|
| X | 2.0 |
| Y | 1.0 |
| Z | 0.5 |

FIG. 12B

| AVAILABLE PERIOD | WEIGHTING COEFFICIENT |
|---|---|
| WITHIN ONE WEEK FROM PUBLIC DISCLOSURE | 2.0 |
| WITHIN PERIOD FROM ONE WEEK TO ONE MONTH FROM PUBLIC DISCLOSURE | 1.5 |
| ONE MONTH OR MORE LATER THAN PUBLIC DISCLOSURE | 1.0 |

INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This is a Continuation of application Ser. No. 15/918,300 filed Mar. 12, 2018, which is a Division of application Ser. No. 15/441,777 filed Feb. 24, 2017, which is based on and claims priority under 35 USC 119 from Japanese Patent Application No. 2016-157950 filed Aug. 10, 2016. The disclosure of the prior applications is hereby incorporated by reference herein in their entirety.

BACKGROUND

(i) Technical Field

The present invention relates to an information processing apparatus, an information processing method, and a non-transitory computer readable medium.

(ii) Related Art

Viewers as participants in a lecture may reproduce and view a video that is provided in video data or moving image data. In related art, a sender side providing the video has difficulty in recognizing a scene of the video which the viewers are interested in (a scene which the viewers consider to be of value).

SUMMARY

According to an aspect of the invention, there is provided an information processing apparatus. The information processing apparatus includes a receiving unit that receives, during or after reproduction of a video, a predetermined operation with respect to the video, an associating unit that associates the received operation with a reproduction location where the received operation has been generated in the video, and a setting unit that sets in response to the received operation an importance degree of the reproduction location associated with the received operation.

BRIEF DESCRIPTION OF THE DRAWINGS

Exemplary embodiment of the present invention will be described in detail based on the following figures, wherein:

FIG. 3 is a functional block diagram of the e-learning system;

FIG. 4 illustrates a video management table;

FIG. 5 illustrates a user interface (UI) screen presented on a participant terminal apparatus;

FIG. 8 illustrates an interest coefficient management table;

FIG. 10 illustrates an example of an importance degree file and a time bar of the importance degree;

FIG. 11 illustrates an example of a time bar image; and

FIG. 12A and FIG. 12B illustrate weighting coefficient management tables.

DETAILED DESCRIPTION

An exemplary embodiment of the present invention is described below with reference to the attached drawings.

Figure 1:
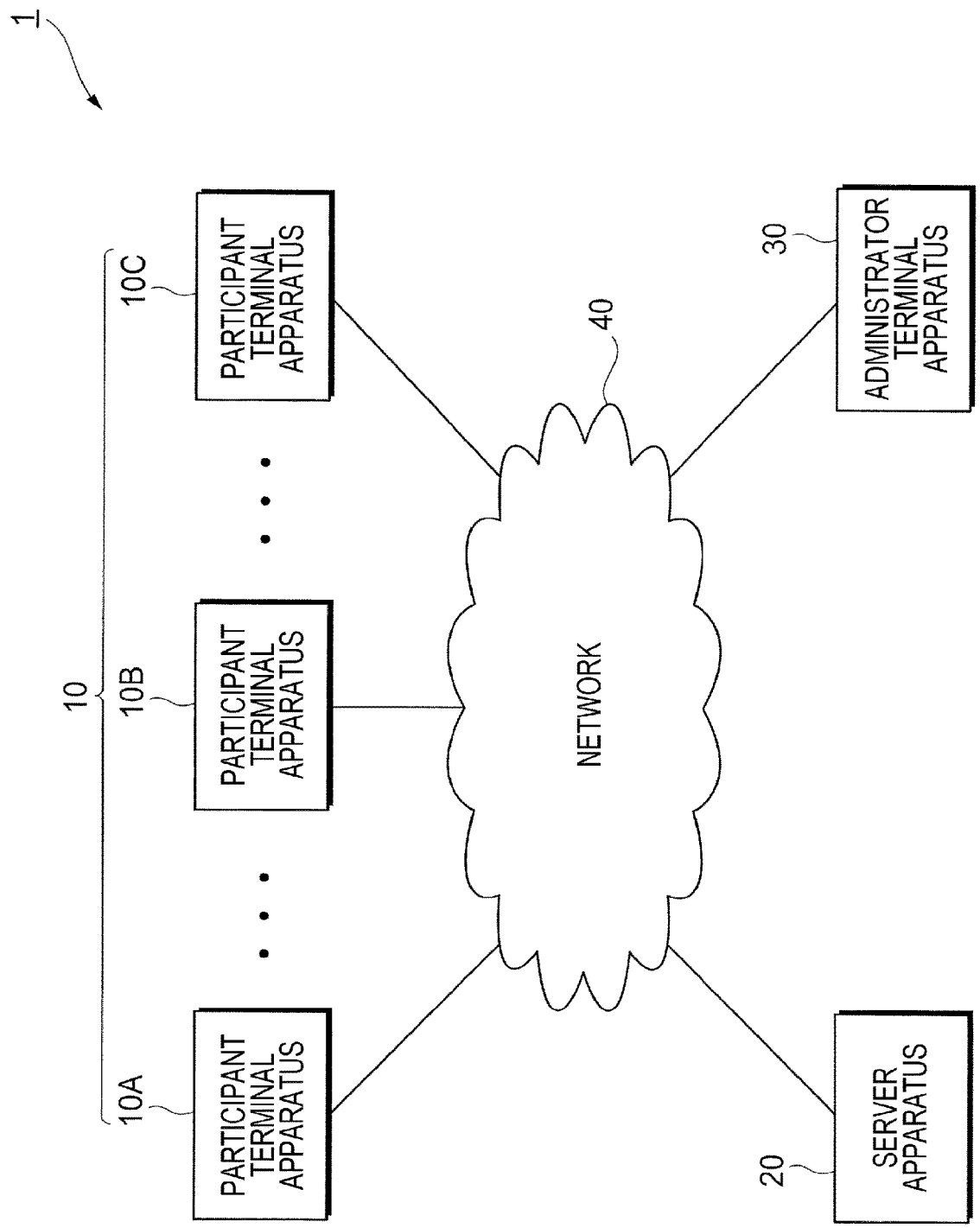
FIG. 1 generally illustrates a configuration of an e-learning system of an exemplary embodiment.

FIG. 1 generally illustrates a configuration of an e-learning system 1 of an exemplary embodiment.

The e-learning system 1 includes a participant terminal apparatus group 10 including multiple participant terminal apparatuses 10A through 10O (three terminal apparatuses in the exemplary embodiment), a server apparatus 20, an administrator terminal apparatus 30, and a network 40.

Each of the participant terminal apparatuses 10A through 10O forming a participant terminal apparatus group 10 is a computer that may be used by a participant (such as a student) who listens to a lecture in the e-learning that is based on video content (lecture video). The participant terminal apparatuses 10A through 10O may be respectively used by different participants. Each of the participant terminal apparatuses 10A through 10O may be assigned to multiple participants. In the exemplary embodiment, the participant terminal apparatus group 10 includes three participant terminal apparatuses 10A through 10O. The number of participant terminal apparatuses included in the participant terminal apparatus group 10 is any number equal to or above one.

The server apparatus 20 is a computer that stores video content to be used in the lecture of the e-learning, and a variety of data related to the video content, and outputs (delivers) video content in response to a request from each of the participant terminal apparatuses 10A through 10O. The server apparatus 20 of the exemplary embodiment generates an "importance degree" that is determined by a degree of how much each participant is interested in the video content that is output. The "importance degree" is described below in detail.

The administrator terminal apparatus 30 is a computer that may be used by an administrator (for example, a teacher) who manages the lecture of the e-learning. The administrator terminal apparatus 30 is used to manage (register, delete, or edit) the video content stored on the server apparatus 20. The administrator terminal apparatus 30 receives the "importance degree" from the server apparatus 20 via the network 40.

In the e-learning system 1 of the exemplary embodiment, one of the participant terminal apparatuses 10A through 10O receives video content (lecture video) from the server apparatus 20 via the network 40, and reproduces the video content. A viewer using the participant terminal apparatus thus performs the learning using the video content. In the e-learning system 1 as well, each of the participant terminal apparatuses 10A through 10O may receive and reproduce the same video content. The participant terminal apparatuses 10A through 10O may receive the same video content during the same period of time (the server apparatus 20 multi-casts the video content), or may receive the same video content during different periods of time (the server apparatus 20 uni-casts the video content). In the e-learning system 1 of the exemplary embodiment, the participant terminal apparatuses 10A through 10O receive from respective participants a variety of operations (as described in detail below) to be applied to the video content currently being reproduced or after being reproduced (as described in detail below), and outputs the operations to the server apparatus 20 via the network 40. Depending on contents of each received operation, the server apparatus 20 determines the "importance degree" of each piece of video content stored on the server apparatus 20. The "importance degree" determined by the server apparatus 20 is transmitted to the administrator terminal apparatus 30 via the network 40.

Figure 2:
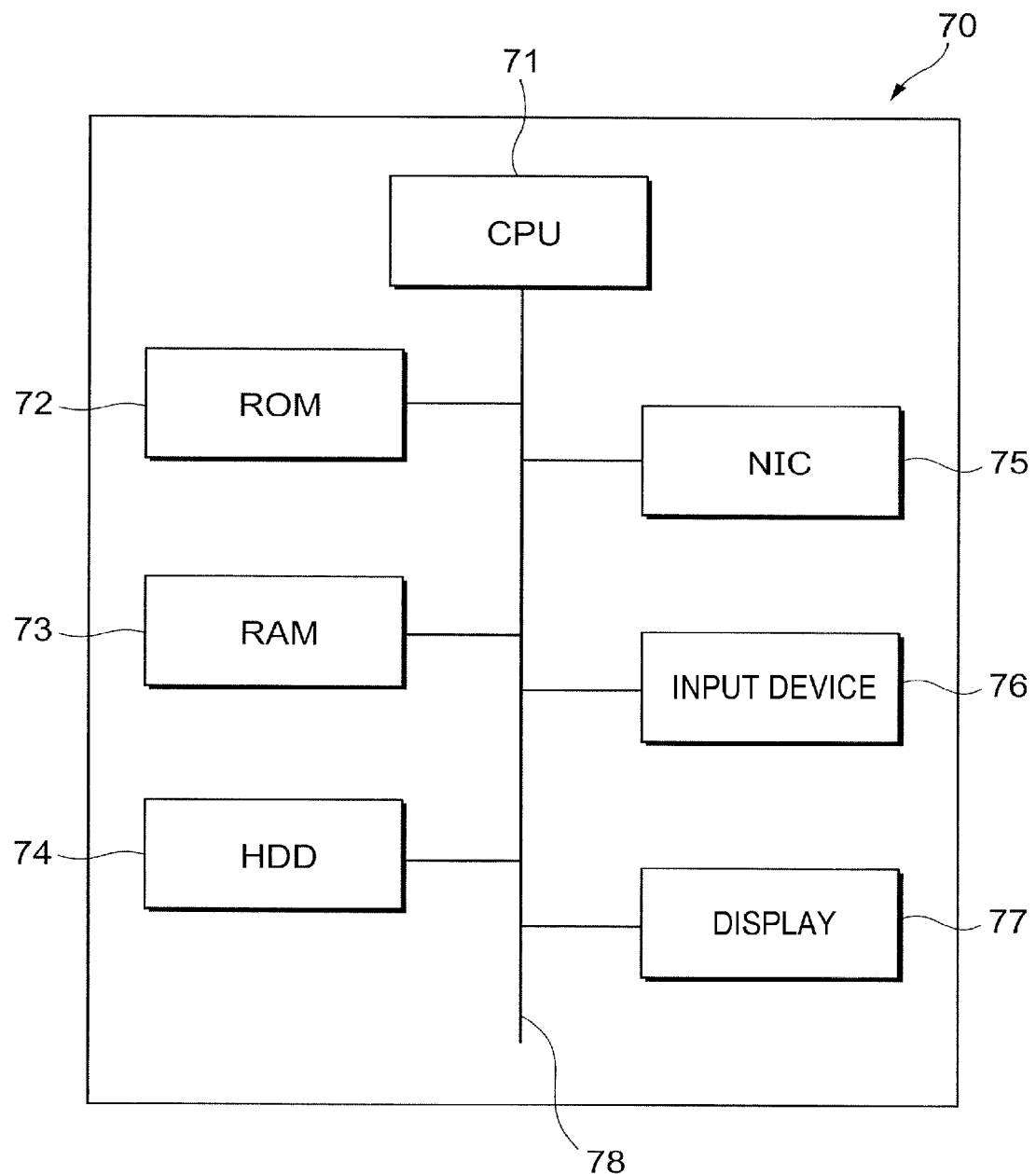
FIG. 2 illustrates a hardware configuration of a computer.

FIG. 2 illustrates a hardware configuration of a computer 70 that serves as each of the participant terminal apparatuses 10A through 10O, the server apparatus 20, and the administrator terminal apparatus 30.

The computer 70 includes a central processing unit (CPU) 71, a read-only memory (ROM) 72, and a random-access memory (RAM) 73. The CPU 71 reads and executes an OS and a variety of programs. The ROM 72 stores a program that is executed by the CPU 71 and data that is used when the CPU 71 executes the program. The RAM 73 stores data that is temporarily generated when the program is executed. The computer 70 further includes a hard disk drive (HDD) 74, a network interface card (NIC) 75, an input device 76, a display 77, and a bus 78. The HDD 74 stores a variety of programs and a variety of data. The NIC 75 exchanges data with a device disposed external to the computer 70. The input device 76 receives an input from a user. The display 77 displays an image on a display screen thereof. The bus 78 interconnects these elements. The input device 76 includes a keyboard, a mouse, and the like. The display 77 includes a liquid-crystal display or the like. The program to be executed by the CPU 71 in the computer 70 may be pre-stored on the ROM 72 or the HDD 74. Alternatively, the program may be delivered to the CPU 71 in a recorded form on a storage medium, such as a compact disk read-only memory (CD-ROM), or may be delivered to the CPU 71 via the network 40.

FIG. 3 is a functional block diagram of the e-learning system 1 of FIG. 1. Referring to FIG. 3, the participant terminal apparatuses 10B and 10C forming the participant terminal apparatus group 10 and the network 40 are not illustrated. Each of the participant terminal apparatuses 10B and 10C is identical in configuration to the participant terminal apparatus 10A.

The participant terminal apparatus 10A includes a video reproducing unit 11 and an operation acquisition unit 12. The video reproducing unit 11 reproduces video content (an example of video) acquired from the server apparatus 20 via the network 40 (not illustrated). The operation acquisition unit 12 receives an operation of a participant who uses the participant terminal apparatus 10A. The participant terminal apparatus 10A displays the video content on the display 77 (see FIG. 2), and receives the operation of the user via the input device 76 (see FIG. 2).

The server apparatus 20 as an example of an information processing apparatus includes a video management unit 21 and an operation recording unit 22. The video management unit 21 manages video content to be supplied to the participant terminal apparatus 10A or the like. On each piece of video content or on each participant, the operation recording unit 22 records data related to contents of the operation acquired from the participant terminal apparatus 10A or the like. The server apparatus 20 further includes an individual interest degree generating unit 23, and an interest coefficient storage unit 24. The individual interest degree generating unit 23 generates a time sequential change in the interest degree of each participant concerning the video content (hereinafter referred to as referred to as an "individual interest degree"). The interest coefficient storage unit 24 stores a predetermined interest coefficient that is used when the individual interest degree generating unit 23 generates an individual interest degree. The server apparatus 20 further includes an importance degree generating unit 25 and a weighting coefficient storage unit 26. The importance degree generating unit 25 generates a time sequential change in the interest degrees of multiple participants concerning the video content by successively accumulating the individual interest degrees of the multiple participants generated by the individual interest degree generating unit 23 (hereinafter referred to as an "importance degree"). The weighting coefficient storage unit 26 stores a predetermined weighting coefficient that is used when the importance degree generating unit 25 generates the importance degree. The server apparatus 20 further includes an importance degree notifying unit 27 that notifies to the administrator terminal apparatus 30 via the network 40 (not illustrated) data of the importance degree of the video content generated by the importance degree generating unit 25 (data of a time bar image described below). In accordance with the exemplary embodiment, the operation recording unit 22 functions as an example of a receiving unit, the individual interest degree generating unit 23 functions as an example of an associating unit, and the individual interest degree generating unit 23 and the importance degree generating unit 25 function as an example of a setting unit.

The administrator terminal apparatus 30 includes an importance degree receiving unit 31. The importance degree receiving unit 31 receives the data of the importance degree (the data of the time bar image) transmitted from the server apparatus 20 via the network 40 (not illustrated). The administrator terminal apparatus 30 displays the received data of the importance degree on the display 77 (see FIG. 2).

FIG. 4 illustrates a video management table that is used by the server apparatus 20. The video management table is stored on the video management unit 21 (see FIG. 3) provided in the server apparatus 20.

The video management table of FIG. 4 registers "video data". The video data associates a title of a lecture video of the video content (referred to as a video title), a file path of the lecture video (referred to as a video file path), a file path of a index file including the index of the lecture video (referred to as an index file path), and a file path of an importance degree file including the importance degree of the lecture video (referred to as an importance degree file path). In the e-learning system 1 of the exemplary embodiment, the video management table is updated each time the administrator using the administrator terminal apparatus 30 adds, deletes, or edits (corrects) a lecture video to be provided to the participants.

In the example of FIG. 4, "Introduction to biology" and "Introduction to physics" are registered as lecture contents on the video management table. The "Introduction to biology" registered as the video data includes three pieces of video data including "Introduction to biology (first session)", "Introduction to biology (second session)", and "Introduction to biology (third session)". The "Introduction to physics" registered as the video data includes three pieces of video data including "Introduction to physics (first session)", "Introduction to physics (second session)", and "Introduction to physics (third session)". For example, in "Introduction to biology (first session)", the video file path is set to be "C:$movie$biology1.wmv", the index file path is set to be "C:$index$biology1.txt", and the importance degree file path is set to be "C:$importance$biology1.dat".

FIG. 5 illustrates a user interface (UI) screen 100 presented on the display 77 in each of the participant terminal apparatuses 10A through 100 in the e-learning system 1 of the exemplary embodiment.

The UI screen 100 includes a title display area 110 disposed on the top left corner of the screen, a video display box 120 disposed in the center of the screen, and a video operation receiving box 130 disposed below the video display box 120. The UI screen 100 further includes an index display box 140 disposed to the left side of the video display box 120. The UI screen 100 further includes a note receiving display box 150 disposed as the top tier box, a favorite receiving display box 160 as the middle tier box, and a test receiving display box 170 as the bottom tier box on the right side of the video display box 120. FIG. 5 also illustrates a pointer 180 that moves within the UI screen 100 in response to the operation of the input device 76 (see FIG. 2).

In the e-learning system 1 of the exemplary embodiment, each of the participant terminal apparatuses 10A through 100 acquires from the server apparatus 20 a lecture video the participants want to view by specifying the video tile to the server apparatus 20. FIG. 5 illustrates the UI screen 100 that is displayed on the participant terminal apparatus 10A when the video data of "Introduction to biology (first session)" of FIG. 4 is acquired.

The title display partition 110 displays the title of the lecture video. In this example, "Introduction to biology (first session)" is displayed as the video title of the video data in the title display area 110.

The video display box 120 displays the lecture video. In this example, the video display box 120 displays the lecture video specified by the video file path "C:$movie$biology1.wmv" of the video data.

The video operation receiving box 130 receives operations that the participant performs using the pointer 180 and that are related to the reproduction of the lecture video to be displayed on the video display box 120. Such operations may include reproducing, pause, fast forward, reverse, and volume control. Time information of the lecture video reproduced on the video display box 120 (present reproduction time and time period for reproducing the whole lecture video) is displayed on the right side of the video operation receiving box 130. In this example, 0:50 (present reproduction time and 3:00 (time period for reproducing the whole lecture video).

The index display box 140 displays the index of the lecture video. The index specified by the index file path "C:$index$biology1.txt" of the video data is displayed in the index display box 140. In this example, the index includes "0:00 Opening→1:00 Concerning A→2:00 Concerning B".

While the lecture video is displayed on the video display box 120 regardless of operation (regardless of whether the participant terminal apparatus is reproducing or in pause), the note receiving display box 150 receives from the participant via the pointer 180 an operation to display a screen (hereinafter referred to as a note screen) configured to receive a note or text input. When the note receiving display box 150 receives the operation, the note screen (not illustrated) is displayed together with the video display box 120 on the UI screen 100. The participant is thus enabled to enter text on the note screen via the input device 76 (see FIG. 2) with the lecture video displayed on the video display box 120.

While the lecture video is displayed on the video display box 120 regardless of operation (regardless of whether the participant terminal apparatus is reproducing or in pause), the favorite receiving display box 160 receives from the participant via the pointer 180 an operation to register present reproduction time as time for a favorite video out of the lecture video. When the favorite receiving display box 160 receives the operation, the lecture video may be reproduced starting at the registered time (time for the favorite video).

While the lecture video is displayed on the video display box 120 regardless of operation (regardless of whether the participant terminal apparatus is reproducing or in pause) or after the lecture video is displayed (after the reproduction), the test receiving display box 170 receives from the participant via the pointer 180 an operation to display a screen concerning a test related to the lecture video. When the test receiving display box 170 receives the operation, the test screen (not illustrated) is displayed in place of the video display box 120 on the UI screen 100. The participant may enter text (answer to the test) on the test screen via the input device 76 (see FIG. 2) with the lecture video possibly serving as a hint not illustrated.

An importance degree generating process to be executed by the server apparatus 20 in the e-learning system 1 of the exemplary embodiment is described below. The importance degree generating process of the exemplary embodiment is performed each time the server apparatus 20 outputs (delivers) the lecture video (video data) to one of the participant terminal apparatuses 10A through 100 forming the participant terminal apparatus group 10.

Figure 6:
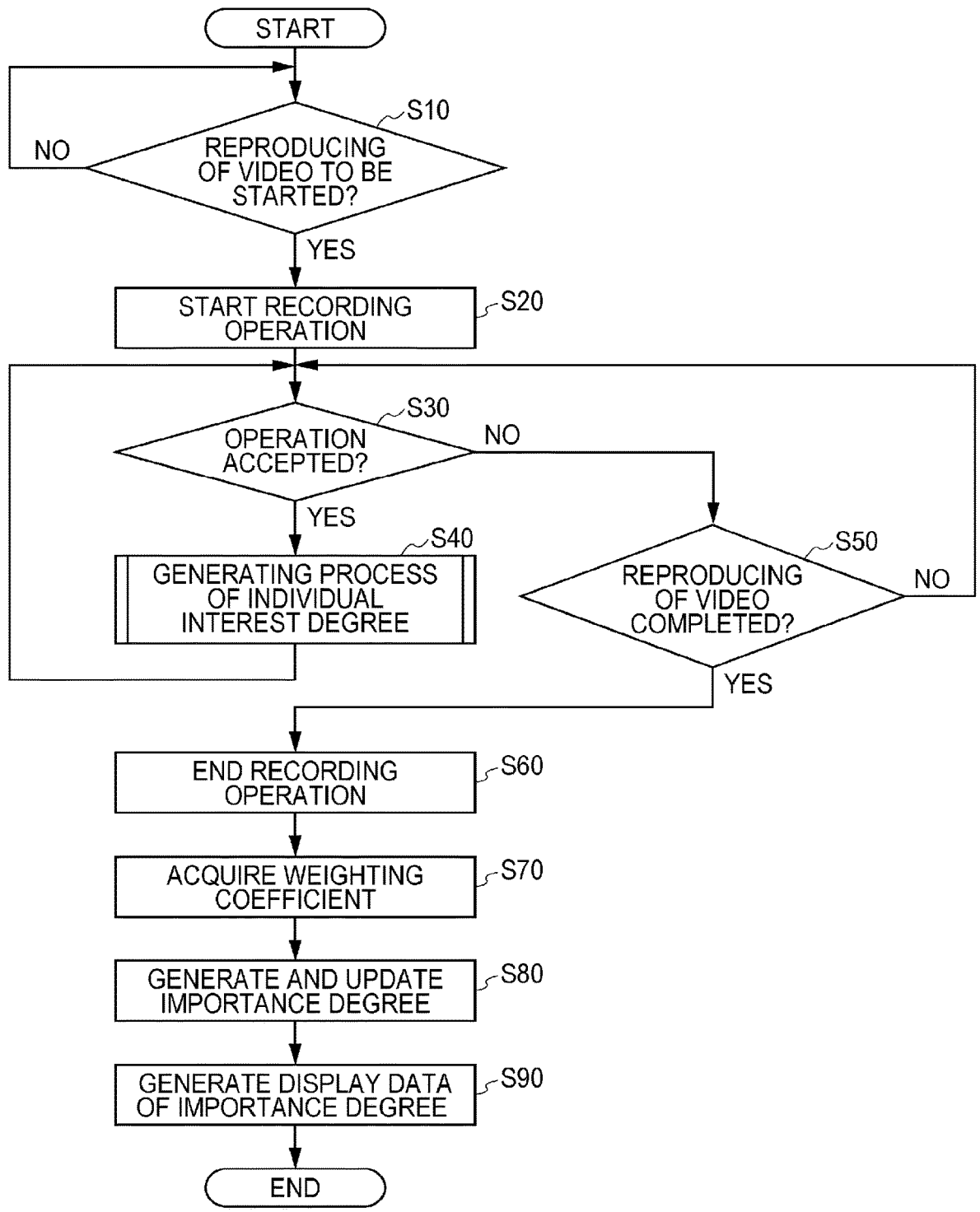
FIG. 6 is a flowchart illustrating an importance degree generating process.
Figure 7:
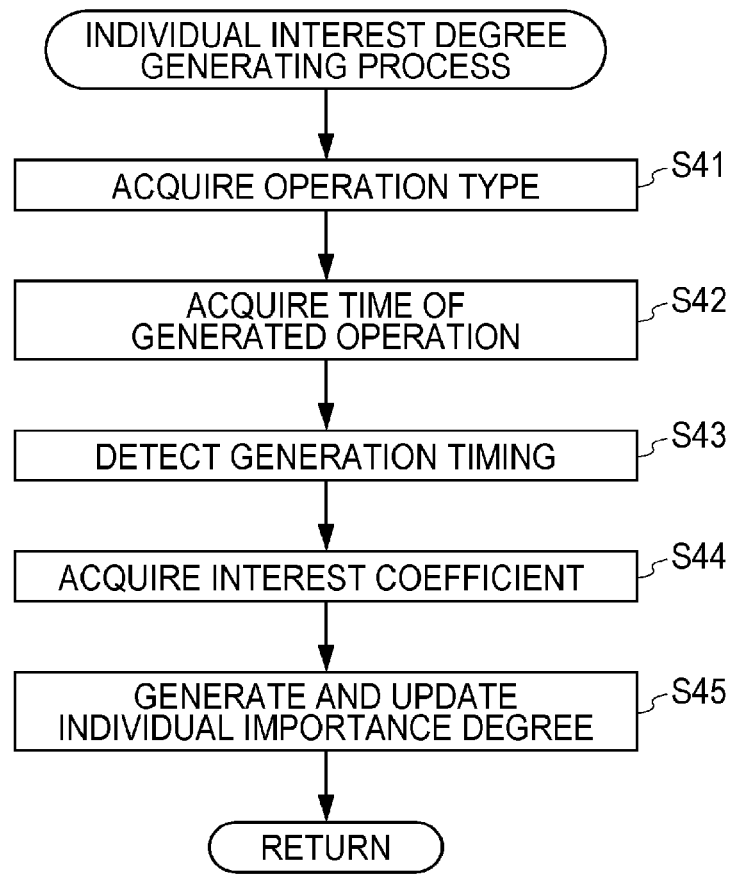
FIG. 7 is a flowchart (subroutine) of an individual interest degree generating process.

FIG. 6 is a flowchart illustrating the importance degree generating process. The following discussion is based on the premise that the participant views (listens to) the importance degree generating process on the participant terminal apparatus 10A of the participant terminal apparatus group 10. The following discussion is also based on the premise that the server apparatus 20 has output the lecture video (such as "Introduction to biology (first session)) to the participant terminal apparatus 10A. The processes of FIG. 6 and FIG. 7 are performed by the server apparatus 20 that executes the program thereof.

In the process of FIG. 6, the server apparatus 20 determines whether the operation recording unit 22 has received from the operation acquisition unit 12 in the participant terminal apparatus 10A an operation related to a reproduction start of the lecture video (step S10). If the determination result in step S10 is non-affirmative (no), the server apparatus 20 returns to step S10 to perform the operation in step S10.

If the determination result in step S10 is affirmative (yes), the operation recording unit 22 starts the recording related to the operation acquired from the operation acquisition unit 12 in the participant terminal apparatus 10A (step S20). The operation recording unit 22 determines whether an operation related to the lecture video has been received from the operation acquisition unit 12 in the participant terminal apparatus 10A (step S30). If the determination result of step S30 is affirmative (yes), the server apparatus 20 performs a generating process of the individual interest degree to generate an individual interest degree of a participant who uses the participant terminal apparatus 10A (views the lecture video) (step S40), and returns to step S30 to perform the operations in S30 and subsequent steps.

If the determination result of step S30 is non-affirmative (no), the operation recording unit 22 determines whether an operation concerning the end of the reproduction of the lecture video has been received from the operation acquisition unit 12 in the participant terminal apparatus 10A (step S50). If the determination result of step S50 is non-affirmative (no), the server apparatus 20 returns to step S30 to perform the operations in step S30 and subsequent steps.

If the determination result of step S50 is affirmative (yes), the operation recording unit 22 ends the recording of the operation related to the lecture video (S60) acquired from the operation acquisition unit 12 in the participant terminal apparatus 10A (step S60). The importance degree generating unit 25 acquires a weighting coefficient from the weighting coefficient storage unit 26 (step S70). The importance degree generating unit 25 generates a new importance degree and performs importance degree updating, using the importance degree generated in the preceding importance degree generating process, the individual interest degree generated in the current importance degree generating process, and the weighting coefficient read in step S70 (step S80). The importance degree notifying unit 27 then generates importance degree displaying data used to display the importance degree generated in step S80 on the screen (step S90), and outputs the importance degree displaying data to the administrator terminal apparatus 30. The importance degree generating process is thus complete.

FIG. 7 is a flowchart (subroutine) of the generating process of the individual interest degree illustrated in step S40 of FIG. 6.

In the process of FIG. 7, the individual interest degree generating unit 23 acquires the type of the operation of the lecture video (hereinafter referred to as an operation type) received in step S30 (step S41). The operation type is described in detail below.

The individual interest degree generating unit 23 acquires time of generation of the operation to the lecture video received in step S30 (step S42). The generation time of the operation acquired in step S42 is not present time, but reproduction time at which the operation to a target lecture video has been generated.

The individual interest degree generating unit 23 detects a generation timing of the operation to the lecture video received in step S30 (step S43). The generation timing of the operation is either during the reproduction of the target lecture video or after the reproduction (after the test).

The individual interest degree generating unit 23 acquires from the interest coefficient storage unit 24 the interest coefficient corresponding to the operation type acquired in step S41 (step S44). The individual interest degree generating unit 23 generates the individual interest degree related to the lecture video and performs individual interest degree updating by associating the generation time of the operation acquired in step S42 with the interest coefficient acquired in step S44 with respect to the lecture video (step S45). The subroutine of the individual interest degree generating process thus ends. Processing returns to step S30 of FIG. 6 to continue the process.

FIG. 8 illustrates an interest coefficient management table used by the server apparatus 20. The interest coefficient management table is stored on the interest coefficient storage unit 24 (see FIG. 3) provided in the server apparatus 20.

The interest coefficient management table of FIG. 8 stores "interest coefficient data" that associates the operation type corresponding to a lecture video to be reproduced, the generation timing of the operation, the interest coefficient set for the operation, and affected time set for the generation time of the operation. In the e-learning system 1 of the exemplary embodiment, the administrator using the administrator terminal apparatus 30 sets the interest coefficient management table. The interest coefficient of the exemplary embodiment is higher as the participant's interest becomes higher in positive value, and is lower as the participant's interest becomes lower in negative value. The interest coefficient management table of FIG. 8 lists a possible reason at the rightmost column for each operation type. Such reasons are listed for discussion purposes only, and are not listed in the real interest coefficient management table.

In the example of FIG. 8, the operation type column lists "Note", "Favorite", "Test", and "Reproducing". The operation type "Note" means that the note receiving display box 150 is selected (clicked) on the UI screen 100 of FIG. 5. The operation type "Favorite" means that the favorite receiving display box 160 is selected on the UI screen 100 of FIG. 5. The operation type "Test" means that the test receiving display box 170 is selected on the UI screen 100 of FIG. 5. The operation type "Reproducing" means that a reproduction button in the video operation receiving box 130 is selected on the UI screen 100 of FIG. 5.

With respect to the operation type "Note", a generation timing column lists "Video viewing in progress", an interest coefficient column lists "+2", and an affected time column lists "Durations of 3 seconds before and 3 seconds after time when note writing starts". The interest coefficient of the operation type "Note" is set to be "+2" because of the following reason. The participant takes note by clicking the note receiving display box 150 during the video viewing in progress because the participant's interest in the generation time (scene) of the lecture video is considered to be higher.

With respect to the operation type "Favorites", the generation timing column lists "Video viewing in progress", the interest coefficient column lists "+1", and the affected time column lists "Durations of 3 seconds before and 3 seconds after time when favorites are set". The interest coefficient of the operation type "Favorites" is set to be "+1" because of the following reason. The participant sets the lecture video to be favorites by clicking the favorite receiving display box 160 during the "Video viewing in progress" because the participant may possibly want to review the lecture video from the reproduction time of the lecture video later (the participant may be interested in the lecture video).

With respect to the operation type "Test", the generation timing column lists "Video viewing in progress", the interest coefficient column lists "−3", and the affected time column lists "After viewing time when session transitions into test". The interest coefficient of the operation type "Test" is set to be "−3" because of the following reason. The participant takes a test by clicking the test receiving display box 170 during the "Video viewing in progress" (the participant displays the test screen without the video display box 120 in place of the UI screen 100 having the video display box 120) because the participant may not feel like viewing the lecture video to the end thereof because he or she is not very much interested in the reproduction time (scene) of the lecture video.

With respect to the operation type "Reproducing", the generation timing column lists "After test", the interest coefficient column lists "+1", and the affected time column lists "Time when reproduction starts". The interest coefficient of the operation type "Reproducing" is set to be "+1" because of the following reason. The participant reproduces the lecture video corresponding to the test by clicking the reproduction button of the video operation receiving box 130 "After test", namely, after the participant has taken the test by clicking the test receiving display box 170. In this case, the participant may possibly check the contents of the lecture the participant does not understand well during the test (the participant is very much interested in) by reviewing the specified lecture video from the reproduction time (scene).

The four operation examples as the operation types are described herein. The operation type is not limited to these examples, and another example may be included. The interest coefficient is not limited to those listed in FIG. 8, and the administrator may modify the operation type.

The importance degree generating process (and the individual interest degree generating process as the subroutine) of the exemplary embodiment is described using a specific example. The e-learning system 1 may now begin with an initial state where no importance degree is set, and the same lecture video "Introduction to biology (first session)" may be viewed by the participant X using the participant terminal apparatus 10A, the participant Y using the participant terminal apparatus 10B, and the participant Z using the participant terminal apparatus 100 in that order.

Figure 9A:
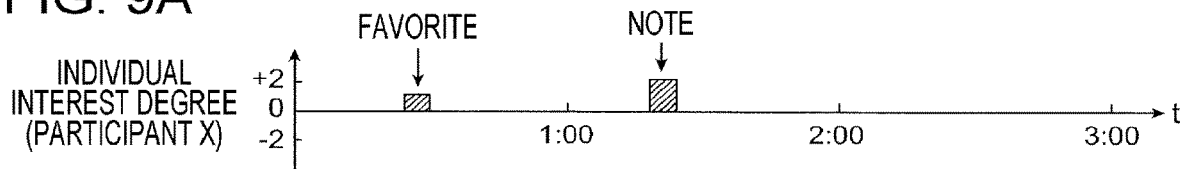
FIG. 9A through FIG. 9F illustrate examples of transitions of the individual interest degree and the importance degree.
Figure 9B:
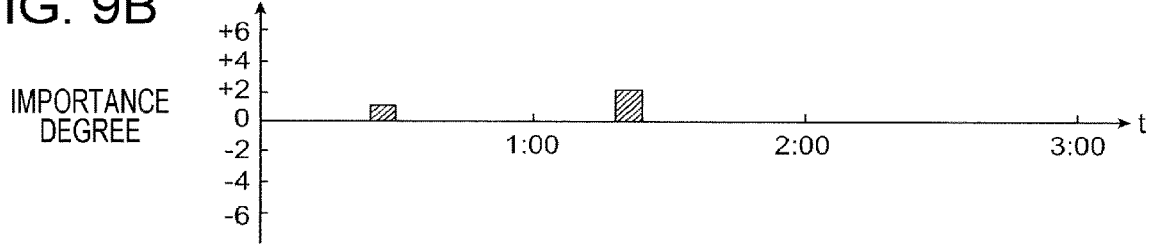
Figure 9C:
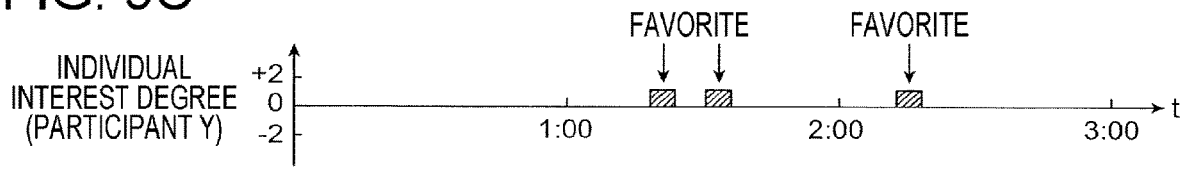
Figure 9D:
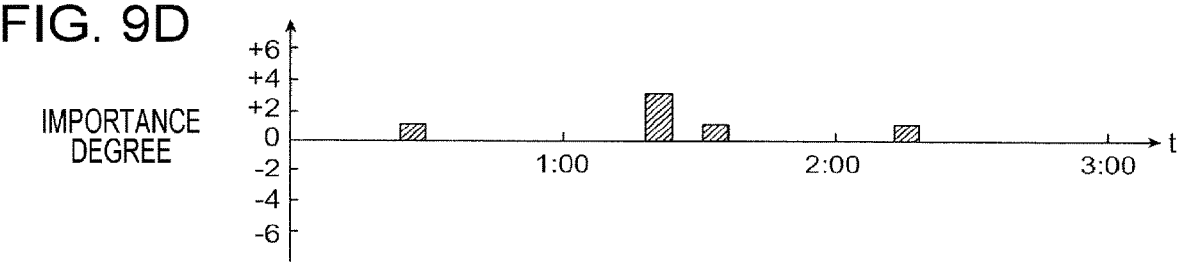
Figure 9E:
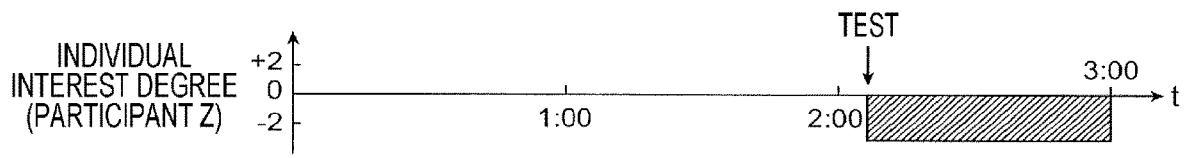
Figure 9F:
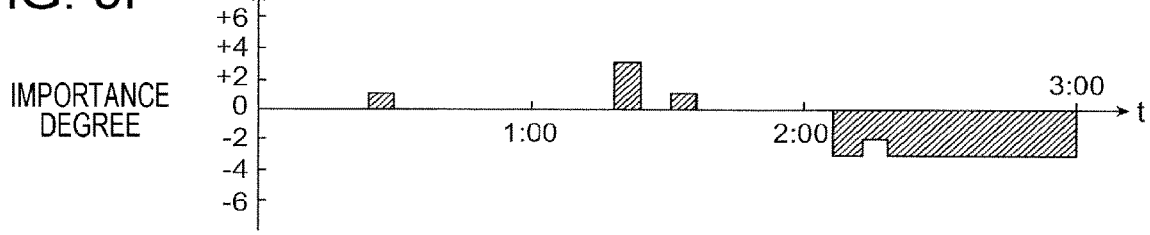

FIG. 9A through FIG. 9F illustrate examples of transitions in the individual interest degree and the importance degree. FIG. 9A illustrates the individual interest degree of the participant X who has viewed "Introduction to biology (first session)", and FIG. 9B illustrates the importance degree of "Introduction to biology (first session)" acquired from the individual interest degree of the participant X. FIG. 9C illustrates the individual interest degree of the participant Y who has viewed "Introduction to biology (first session)" in succession to the participant X, and FIG. 9D illustrates the importance degree of "Introduction to biology (first session)" acquired from the individual interest degrees of the participants X, and Y. FIG. 9E illustrates the individual interest degree of the participant Z who has viewed "Introduction to biology (first session)" in succession to the participants X and Y, and FIG. 9F illustrates the importance degree of "Introduction to biology (first session)" acquired from the individual interest degrees of the participants X, Y and Z. The horizontal axis of each of FIG. 9A through FIG. 9F represent reproduction time t of the lecture video ("Introduction to biology (first session)"), the vertical axis of each of FIG. 9A, FIG. 9C, and FIG. 9E represents the individual interest degree, and the vertical axis of each of FIG. 9B, FIG. 9D, and FIG. 9F represents the importance degree. The discussion of the weighting coefficient is omitted herein.

The participant X may now view the lecture video "Introduction to biology (first session)" on the participant terminal apparatus 10A. The participant X may now click the favorite receiving display box 160 at or near reproduction time 0:25, and may now click the note receiving display box 150 at or near reproduction time 1:20. As illustrated in FIG. 9A, the resulting individual interest degree of the participant X is +1 for a reproduction time period of 0:22 through 0:28 that includes 3 seconds before and 3 seconds after reproduction time 0:25, +2 for a reproduction time period of 1:17 through 1:23 that includes 3 seconds before and 3 seconds after reproduction time 1:20, and ±0 for the rest of the reproduction time.

The importance degree is generated using the individual interest degree of the participant X. Since no participant has viewed "Introduction to biology (first session)" before the participant X in this example, the newly obtained importance degree is the individual interest degree of the participant X. As illustrated in FIG. 9B, the interest degree is +1 for the reproduction time period of 0:22 through 0:28, +2 for the reproduction time period of 1:17 through 1:23, and ±0 for the rest of the reproduction time.

The participant Y then views the lecture video "Introduction to biology (first session)" on the participant terminal apparatus 10B. The participant X may click the favorite receiving display box 160 at or near reproduction time 1:20, at or near reproduction time 1:35, and at or near reproduction time 2:10. As illustrated in FIG. 9C, the resulting individual interest degree of the participant Y is +1 for the reproduction time period of 1:17 through 1:23 that includes 3 seconds before and 3 seconds after reproduction time 1:20, for a reproduction time period of 1:32 through 1:38 that includes 3 seconds before and 3 seconds after reproduction time 1:35, and for a reproduction time period of 2:07 through 2:13 that includes 3 seconds before and 3 seconds after reproduction time 2:10. For the rest of the reproduction time, the interest degree is ±0.

Importance degree updating is performed using the importance degree that is generated in accordance with the individual interest degree of the participant X and the newly obtained individual interest degree of the participant Y. More specifically, importance degree updating is performed by adding the individual interest degree of the participant Y to the generated individual interest degree. As illustrated in FIG. 9D, the interest degree is "+1" for the reproduction time period of 0:22 through 0:28, the reproduction time period of 1:32 through 1:38, and the reproduction time period of 2:07 through 2:13, +3 for the reproduction time period of 1:17 through 1:23, and ±0 for the rest of the reproduction time.

The participant Z then views the lecture video "Introduction to biology (first session)" on the participant terminal apparatus 100. The participant Z may click the test receiving display box 170 at or near reproduction time 2:05. As illustrated in FIG. 9E, the resulting individual interest degree of the participant Z is −3 for a reproduction time period of 2:05 through 3:00 (the end time of "Introduction to biology (first session)"), and is ±0 for the rest of the reproduction time.

Importance degree updating is performed in accordance with the importance degree generated based on the individual interest degrees of the participants X and Y, and the newly obtained individual interest degree of the participant Z. More specifically, importance degree updating is performed by adding the individual interest degree of the participant Z to the previously generated individual interest degree. Referring to FIG. 9F, the interest degree is +1 for the reproduction time period of 0:22 through 0:28, and the reproduction time period of 1:32 through 1:38. The interest degree is +3 for the reproduction time period of 1:17 through 1:23, −3 for a reproduction time period of 2:05 through 2:07 and a reproduction time period of 2:13 through 3:00, and −2 for the reproduction time period of 2:07 through 2:13. The interest degree is ±0 for the rest of the reproduction time.

Each time a participant views the lecture video "Introduction to biology (first session)", the individual interest degree of that participant is generated, and the importance degree is updated using the obtained individual interest degree. In this way, the population of participants contributing to the production of importance degree increases.

FIG. 10 illustrates an example of an importance degree file thus obtained and a time bar of the importance degree. The upper portion of FIG. 10 is a graph of an example of the importance degree file, and the lower portion of FIG. 10 illustrates an example of the time bar of the importance degree the importance degree notifying unit 27 (see FIG. 3) generates based on the importance degree file illustrated in the upper portion of FIG. 10. The horizontal axis of each of the top and lower portions of FIG. 10 represents reproduction time t of the lecture video ("Introduction to biology (first session)" here), and the vertical axis of the upper portion of FIG. 10 represents the importance degree. The whole reproduction time period of the lecture video "Introduction to biology (first session)" is 3 minutes. The first one minute is for the opening of the lecture video, the second one minute is for the explanation about A, and the third one minute is for the explanation about B (see FIG. 5 as well).

Referring to FIG. 10, a first threshold value Th1 and a second threshold value Th2 that is higher than the first threshold value are set with respect to the importance degree of the exemplary embodiment. The importance degree is higher than the second threshold value Th2 for a reproduction time period of 0:06 through 0:28 and a reproduction time period of 1:14 through 1:45. The importance degree is lower than the first threshold value Th1 for a reproduction time period of 0:45 through 1:14 and a reproduction time period of 1:45 through 2:07. The importance degree falls between the first threshold value Th1 and the second threshold value Th2 for the rest of the reproduction time. It is recognized that some participants are more interested in the lecture video for a period throughout which the importance degree is above the first threshold value Th1, and that other participants are less interested in the lecture video for a period throughout which the importance degree is lower than the second threshold value Th2. In the upper portion of FIG. 10, the importance degree is positive, but the importance degree may be negative as illustrated in FIG. 9F.

In accordance with the importance degree file illustrated in the upper portion of FIG. 10, the time bar of the importance degree illustrated in the lower portion of FIG. 10 is segmented into a green-painted period throughout which the importance degree is above the first threshold value Th1, a red-painted period throughout which the importance degree is lower than the second threshold value Th2, and a yellow-painted period throughout which the importance degree falls between the first threshold value Th1 and the second threshold value Th2. The time bar of the importance degree of the exemplary embodiment is thus generated based on the importance degree file, namely, the time distribution of the importance degree, and the first threshold value Th1 and the second threshold value Th2 set with respect to the importance degree.

FIG. 11 illustrates an example of a time bar image of the importance degree. The time bar image of the importance degree is generated by the importance degree notifying unit 27 in the server apparatus 20, is received by the importance degree receiving unit 31 in the administrator terminal apparatus 30, and is then displayed on the display 77 in the administrator terminal apparatus 30. FIG. 11 illustrates the time bar image of the importance degree that is obtained when the importance degree file illustrated in the upper portion of FIG. 10 is obtained in response to the lecture video "Introduction to biology (first session)" of FIG. 4.

The time bar image includes check boxes on the leftmost side thereof, a thumbnail (still image) that is disposed to the right of the check boxes and is characteristic of the lecture video "Introduction to biology (first session)", the time bar to the right of the thumbnail, and a date of update to the right of the time bar. The administrator using the administrator terminal apparatus 30 views the time bar of FIG. 11, and thus visually recognizes in the lecture video a time period throughout which some participants are interested in the lecture video (green-painted time period having a higher importance degree), a time period throughout which other participants are not much interested in the lecture video (red-painted time period having a lower importance degree), and a time period throughout which the participants' interest is neither low nor high (yellow-painted period having an importance degree neither high nor low).

FIG. 12A and FIG. 12B illustrate weighting coefficient management tables. FIG. 12A illustrates weighting coefficients that are respectively set for participants. FIG. 12B illustrates weighting coefficients that are respectively set for lecture attendance time periods of the participants for the lecture video. The weighting coefficient management tables are stored on the weighting coefficient storage unit 26 (see FIG. 3) in the server apparatus 20.

Referring to FIG. 12A, a participant having a relatively higher mark is weighted with a higher weighting coefficient, and a participant having a relatively lower mark is weighted with a lower weighting coefficient. In this example, the participants' marks are lower in the order of the participant X, the participant Y, and the participant Z. The weighting coefficients of the participant X, the participant Y, and the participant Z are respectively 2.0, 1.0, and 0.5.

In the importance degree generating process of FIG. 6, the importance degree generating unit 25 generates (modifies) the individual interest degree using the weighting coefficient of the participant who views the lecture video. The individual interest degree of the participant X is twice the original value by multiplying the original value by the weighting coefficient of 2.0. The individual interest degree of the participant Y is equal to the original value by multiplying the original value by the weighting coefficient of 1.0. The individual interest degree of the participant Z is half the original value by multiplying the original value by the weighting coefficient of 0.5. As a result, the importance degree resulting from the three persons of the participants X, Y, and Z having viewed the lecture video reflects the above weighting coefficients. More specifically, the individual interest degree of the participant having a relatively higher mark is reflected more in the individual interest degree than the individual interest degree of the participant having a relatively lower mark.

The weighting coefficients of the participants are set depending on the participants' relative marks. The method of the determination of weighting coefficients is not limited to this method. For example, the weighting coefficients of the participants may be set depending on the participants' attendance rates to the lecture.

Alternatively, the weighting coefficients of the participants may be set depending on a combination of the relative marks and attendance rates of the participants.

Referring to FIG. 12B, a participant who views relatively earlier after the lecture video is publicly disclosed to each participant (after the lecture video is registered on the server apparatus 20) is weighted with a higher weighting coefficient, and a participant who views relatively later is weighted with a lower weighting coefficient. In this example, a participant who views the lecture video within one week from the public disclosure is weighted with a weighting coefficient of 2.0, a participant who views the lecture video within a period from one week to one month from the public disclosure is weighted with a weighting coefficient of 1.5, and a participant who views the lecture video one month or more later than the public disclosure is weighted with a weighting coefficient of 1.0.

In the importance degree generating process of FIG. 6, the importance degree generating unit 25 generates (modifies) the individual interest degree using the weighting coefficient of the lecture attendance time period of the participant who views the lecture video. The individual interest degree of the participant who views within one week from the public disclosure (the participant X, for example) is twice the original interest degree by multiplying the original interest degree by the weighting coefficient of 2.0 of the lecture attendance period. The individual interest degree of the participant who views within a period from one week to one month from the public disclosure (the participant Y, for example) is 1.5 times the original interest degree by multiplying the original interest degree by the weighting coefficient of 1.5 of the lecture attendance period. The individual interest degree of the participant who views the lecture video one month or more later than the public disclosure (the participant Z, for example) is equal to the original interest degree by multiplying the original interest degree by the weighting coefficient of 1.0 of the lecture attendance period. The importance degrees of the three persons, namely, the participants X, Y, and Z reflect the weighting coefficients in this way. More specifically, the individual interest degree of the participant who views the lecture video earlier is reflected in the importance degree more than the individual interest degree of the participant who views the lecture video later.

In the above discussion, the weighting management table of FIG. 12A and the weighting management table of FIG. 12B are separately used. The exemplary embodiment is not limited to this method. Multiple weighting tables having different settings (such as the two tables of FIG. 12A and FIG. 12B) may be combined in use.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising
a receiving unit that receives, during reproduction of a video, a predetermined operation with respect to the video from a user;
an associating unit that associates the received operation with a reproduction time where the received operation has been generated in the video; and
a controller configured to display an importance degree of the reproduction location associated with the received operation in time series.

* * * * *